United States Patent
Aoki

(10) Patent No.: US 9,093,089 B1
(45) Date of Patent: Jul. 28, 2015

(54) SUSPENSION ASSEMBLY, HEAD SUSPENSION ASSEMBLY AND DISK DEVICE WITH THE SAME

(71) Applicant: Kabushiki Kaisha Toshiba, Minato-ku, Tokyo (JP)

(72) Inventor: Kenichiro Aoki, Machida Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/612,738

(22) Filed: Feb. 3, 2015

(30) Foreign Application Priority Data

Nov. 11, 2014 (JP) ................................. 2014-228882

(51) Int. Cl.
*G11B 5/48* (2006.01)

(52) U.S. Cl.
CPC ........................................ *G11B 5/48* (2013.01)

(58) Field of Classification Search
CPC .......... G11B 5/48; G11B 5/4833; G11B 5/39; G11B 5/3929; G11B 5/3932
USPC ............................................ 360/245.2–245.9
See application file for complete search history.

(56) References Cited

U.S. PATENT DOCUMENTS

| 8,873,202 | B2 * | 10/2014 | Nesori et al. | ................ | 360/244.5 |
| 2001/0046107 | A1 | 11/2001 | Irie et al. | | |
| 2003/0132683 | A1 * | 7/2003 | Yamada et al. | ............... | 310/346 |
| 2004/0169442 | A1 * | 9/2004 | Senoo et al. | ................... | 310/328 |
| 2006/0066691 | A1 * | 3/2006 | Sakaida et al. | ................... | 347/71 |
| 2007/0228876 | A1 * | 10/2007 | Sung | .............................. | 310/320 |
| 2007/0236104 | A1 * | 10/2007 | Fujii | .............................. | 310/358 |
| 2010/0208390 | A1 | 8/2010 | Hanya et al. | | |
| 2010/0244054 | A1 * | 9/2010 | Ogihara et al. | ................. | 257/79 |
| 2011/0211274 | A1 | 9/2011 | Kuwajima | | |
| 2013/0200748 | A1 * | 8/2013 | Nakamura | ..................... | 310/311 |
| 2013/0250007 | A1 * | 9/2013 | Ishimori et al. | ................. | 347/70 |
| 2014/0022675 | A1 | 1/2014 | Hanya et al. | | |
| 2014/0085754 | A1 | 3/2014 | Hanya et al. | | |
| 2014/0091678 | A1 * | 4/2014 | Koizumi et al. | .............. | 310/367 |
| 2014/0168815 | A1 | 6/2014 | Kudo | | |
| 2014/0339961 | A1 * | 11/2014 | Maejima et al. | .............. | 310/358 |
| 2014/0339962 | A1 * | 11/2014 | Furukawa et al. | ............. | 310/363 |
| 2015/0064804 | A1 * | 3/2015 | Horikiri et al. | .................... | 438/3 |

FOREIGN PATENT DOCUMENTS

JP 2011-138596 A 7/2011
JP 2014-139854 A 7/2014

* cited by examiner

*Primary Examiner* — Allen T Cao
(74) *Attorney, Agent, or Firm* — White & Case LLP

(57) ABSTRACT

According to one embodiment, a suspension assembly includes a support plate, a trace member attached to the support plate, and an actuation element configured to expand and contract, and fixed to the trace member. The trace member includes a proximal-end plate portion, a metallic plate including a division plate portion, an insulating layer including a bridge portion, a conductive layer to form a plurality of traces and a counter-plate provided on the bridge portion between the proximal-end plate portion and the division plate portion and opposing the actuation element via the insulating layer, and the actuation element is located on the bridge portion.

20 Claims, 9 Drawing Sheets

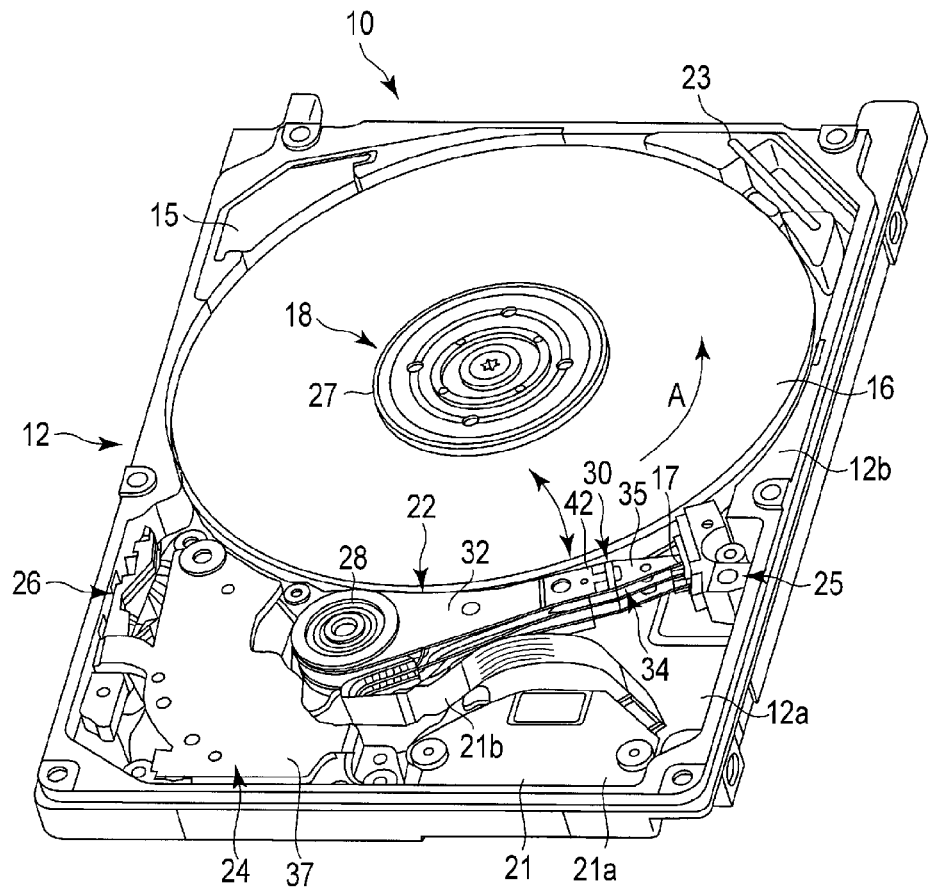
F I G. 1
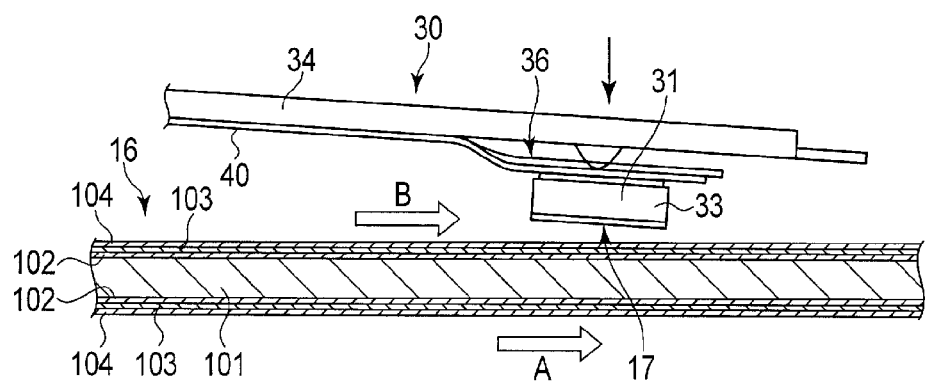
F I G. 2

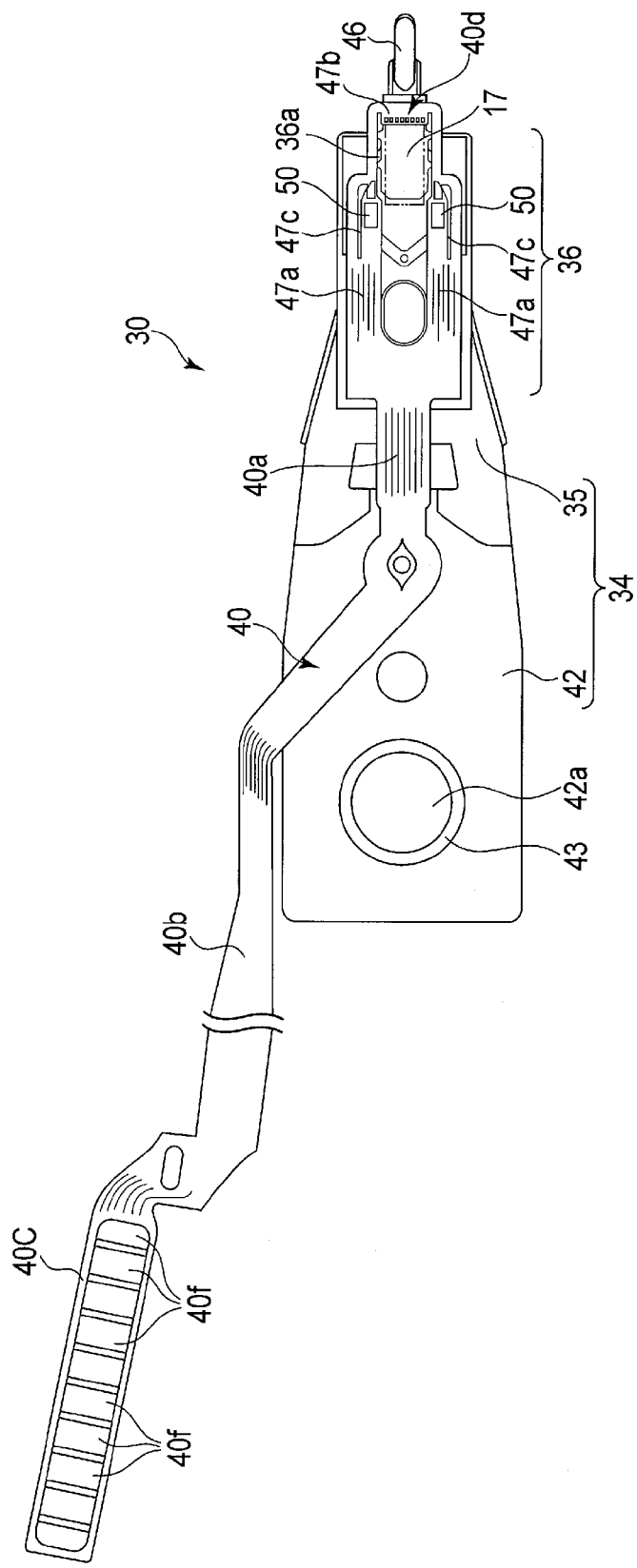
F I G. 3

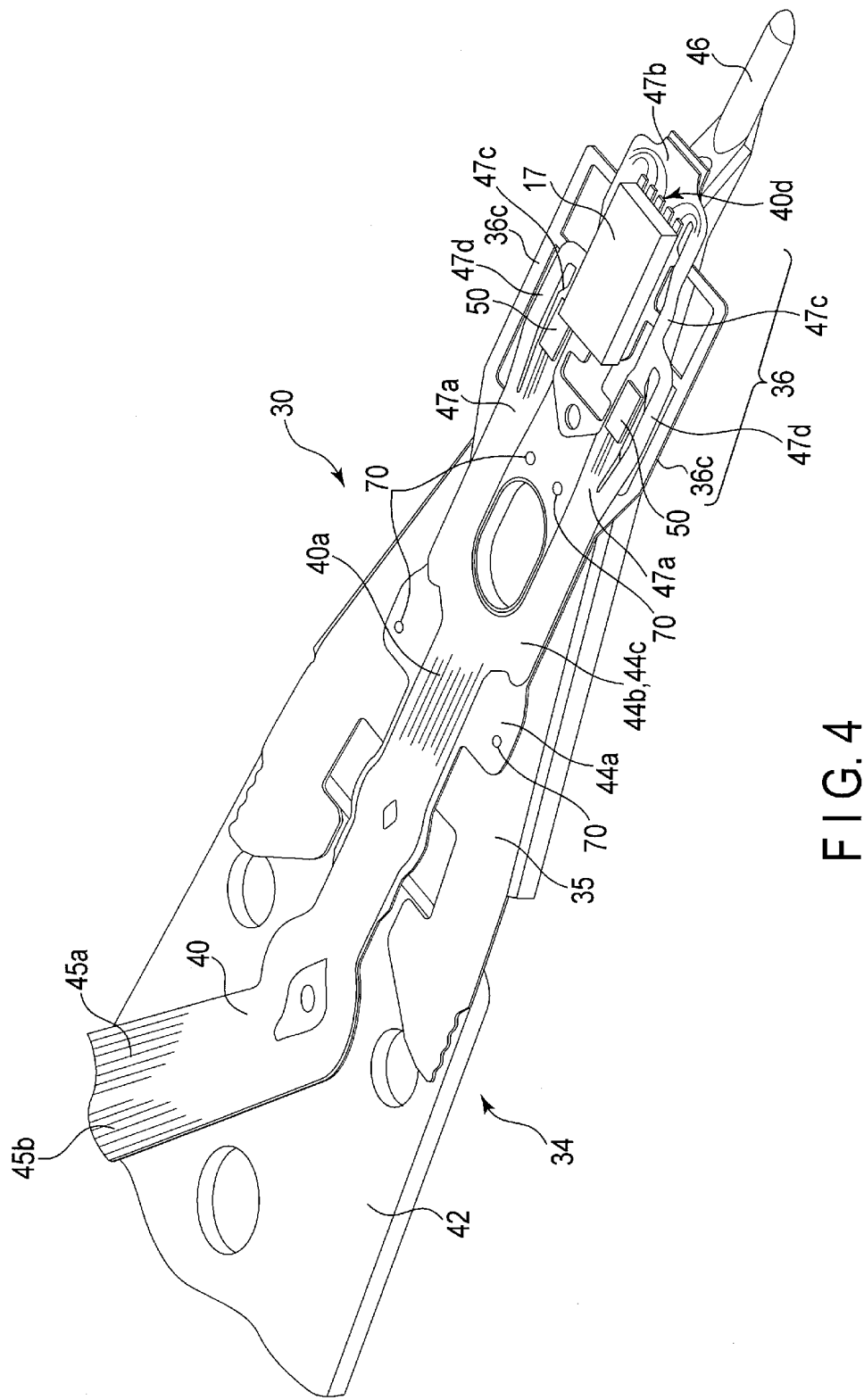
F I G. 4

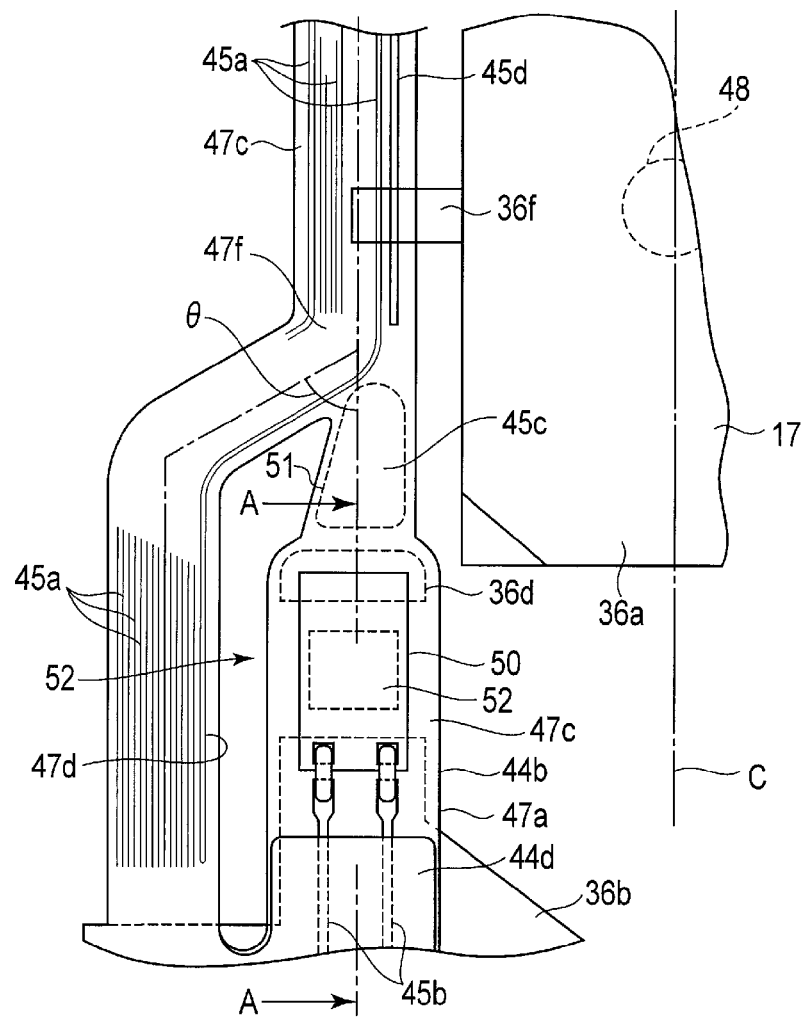
F I G. 7
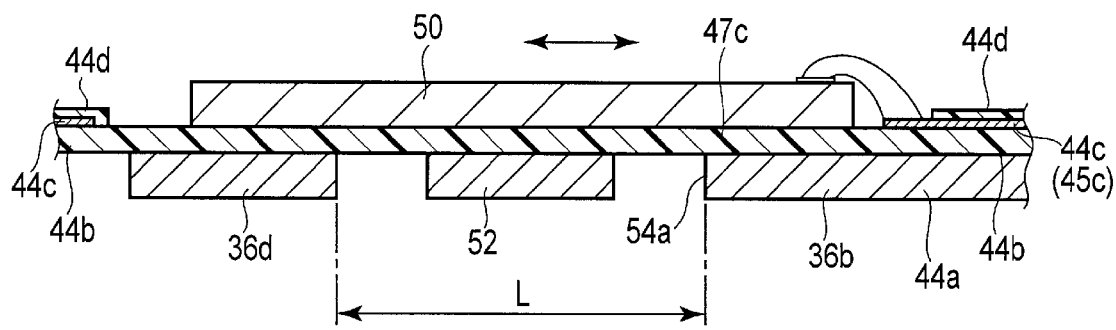
F I G. 8

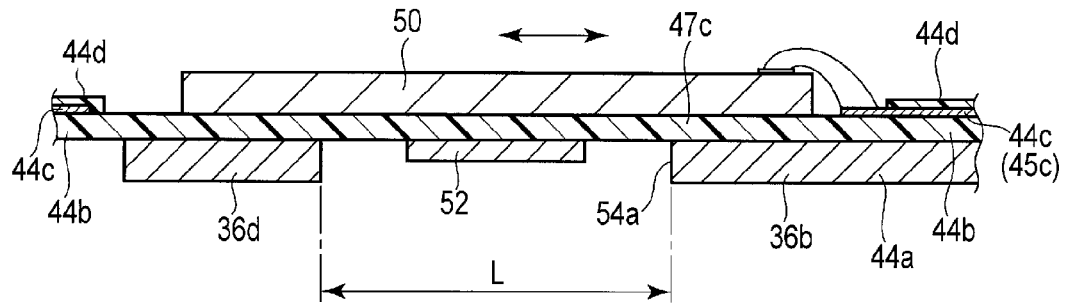
F I G. 10
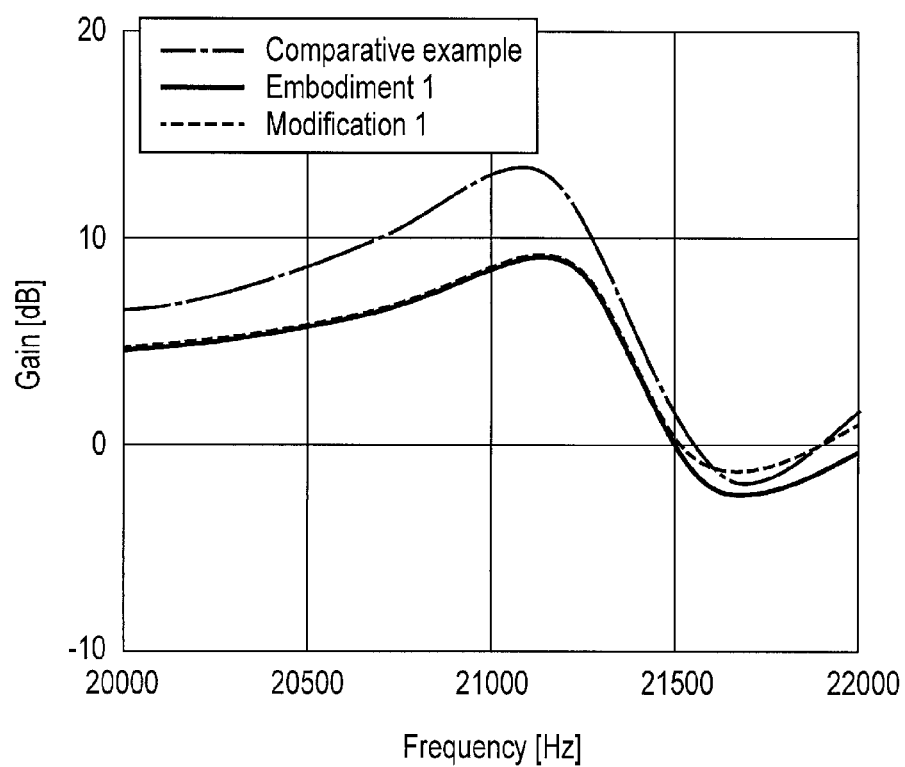
F I G. 11

SUSPENSION ASSEMBLY, HEAD SUSPENSION ASSEMBLY AND DISK DEVICE WITH THE SAME

CROSS-REFERENCE TO RELATED APPLICATIONS

This application is based upon and claims the benefit of priority from Japanese Patent Application No. 2014-228882, filed Nov. 11, 2014, the entire contents of which are incorporated herein by reference.

FIELD

Embodiments described herein relate generally to a suspension assembly, a head suspension assembly and a disk device provided with the same.

BACKGROUND

In recent years, disk devices such as magnetic disk drives and optical disk drives have widely been used as external storage devices of computers and image recording devices.

As such a disk device, for example, a magnetic disk drive generally comprises a magnetic disk provided in a base, a spindle motor which supports and rotates the magnetic disk, and a suspension assembly which supports a magnetic head. The suspension assembly includes a suspension attached to a distal end portion of an arm, a trace member (a flexure or a wiring trace) provided on the suspension and a load beam. The trace member includes a gimbal portion which supports the magnetic head, forming a head suspension assembly.

In more recent years, there is proposed a suspension assembly wherein a piezoelectric element (PZT element) serving as actuation element is mounted in the vicinity of a gimbal portion of a trace member, and a magnetic head is minutely displaced in a seek direction by expansion and contraction of the piezoelectric element. According to the suspension assembly, the operation of the magnetic head can be minutely controlled by controlling a voltage to be applied to the piezoelectric element.

In the suspension assembly, the piezoelectric element is fixed by its entire surface to the trace member. But when the PZT element expands or contracts, it bends in its thickness direction in some cases, which may produce vibrations in directions crossing the expansion/contraction directions (out-of-plane vibration). The out-of-plane vibration is propagated to the suspension via contact points of the trace member, and may excite resonance of the suspension. As a result, the accuracy of positioning the magnetic head is reduced.

BRIEF DESCRIPTION OF THE DRAWINGS

FIG. 1 is a perspective view showing a hard disk drive (HDD) according to a first embodiment;
FIG. 2 is a side view showing a magnetic head and a suspension of a suspension assembly in the HDD, and a magnetic disk;
FIG. 3 is a plan view of the suspension assembly;
FIG. 4 is a perspective view showing the suspension assembly;
FIG. 7 is an enlarged plan view showing part of a gimbal portion of the suspension assembly;
FIG. 8 is a cross-sectional view of an actuation element mounting area of the gimbal portion, which is taken along line A-A in FIG. 7;
FIG. 10 is a cross-sectional view of an actuation element mounting area of a suspension assembly according to a first modification;
FIG. 11 is a diagram showing vibration characteristics of the suspension assemblies according to the first embodiment, the first modification and comparative example.

DETAILED DESCRIPTION

Figure 5:
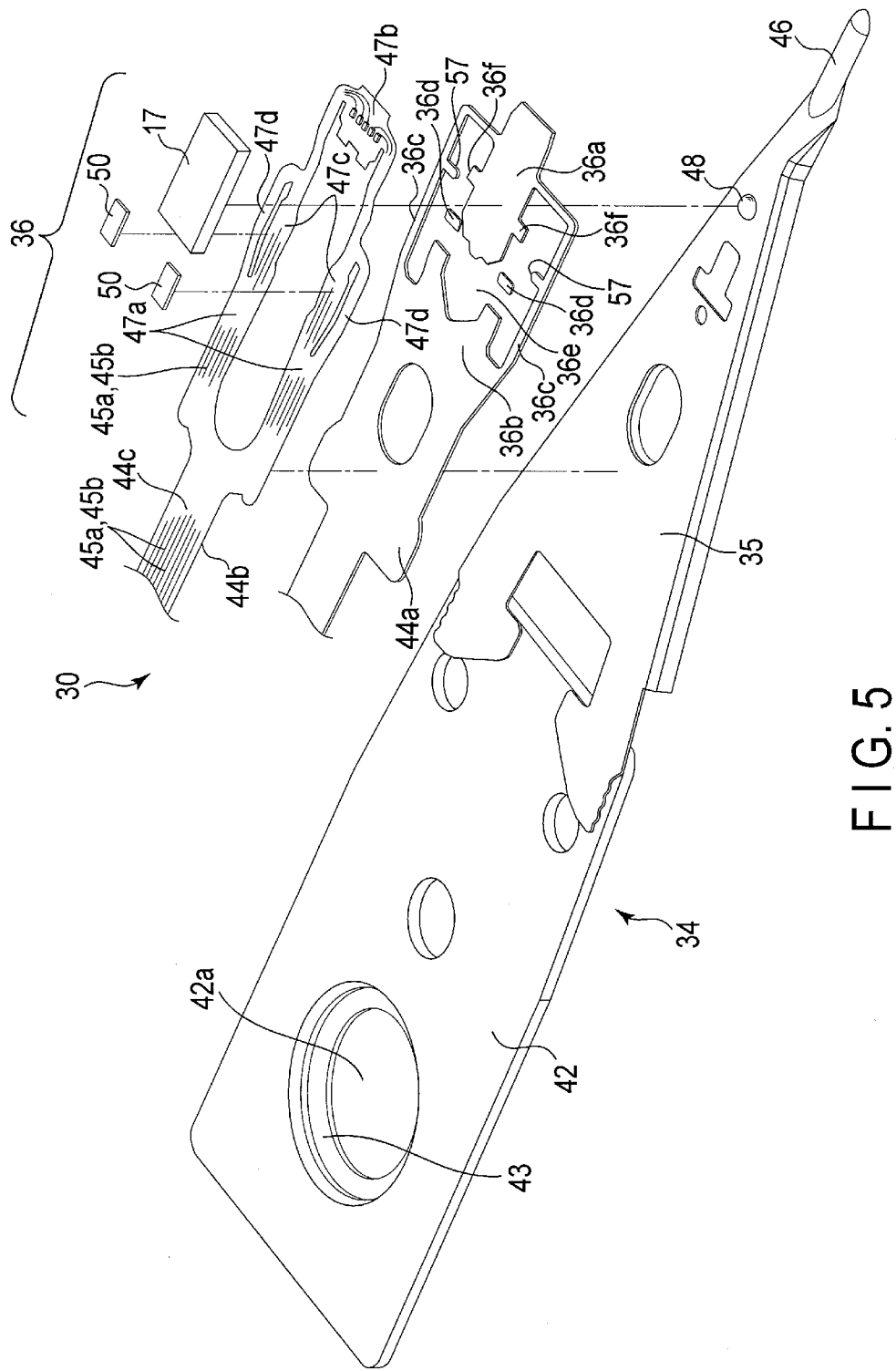
FIG. 5 is an exploded perspective view showing the magnetic head, piezoelectric elements, a flexure and a load beam of the suspension assembly.

Various embodiments will be described hereinafter with reference to the accompanying drawings. In general, according to one embodiment, a suspension assembly comprises a support plate; a trace member attached to the support plate; and an actuation element configured to expand and contract, and fixed to the trace member. The trace member comprises a metallic plate comprising a proximal-end plate portion fixed to the support plate and a division plate portion located apart from the proximal-end plate portion, an insulating layer on the metallic plate and comprising a bridge portion extending from the proximal end plate through the division plate portion, a conductive layer on the insulating layer to form a plurality of traces, and a counter-plate provided on the bridge portion between the proximal-end plate portion and the division plate portion and opposing the actuation element via the insulating layer, and the actuation element is located on the bridge portion to extend across over to the proximal-end plate portion and the division plate portion.

A hard disk drive (HDD) according to an embodiment, which functions as a disk device, will be explained in detail.

First Embodiment

FIG. 1 shows an internal structure of an HDD, with a top cover detached therefrom. As shown in FIG. 1, the HDD comprises a housing 10. The housing 10 comprises a base 12 formed in the shape of a rectangular box which is open on its upper side, and a top cover (not shown) to cover an upper opening of the base 12. The base 12 comprises a rectangular bottom wall 12a and a side wall 12b provided to rise along a peripheral edge of the bottom wall 12a.

In the housing 10 arranged are two magnetic disks 16 as recording media, and a spindle motor 18 provided as a driving section which supports and rotates the magnetic disks 16. The spindle motor 18 is disposed on the bottom wall 12a. The magnetic disks 16 are engaged coaxially with a hub (not shown) of the spindle motor 18, clamped by a clamp spring 27, and thereby fixed to the hub. The magnetic disks 16 are supported in parallel with the bottom wall 12a of the base 12. The magnetic disks 16 are rotated at a predetermined speed by the spindle motor 18 in a direction indicated by arrow A.

A plurality of magnetic heads 17 and a head stack assembly (hereinafter referred to as an HSA) 22 are arranged in the housing 10. The magnetic heads 17 are configured to write and read data on and from the magnetic disks 16, and the HSA 22 supports the magnetic heads 17 such that they are movable with respect to the magnetic disks 16. In the housing 10 arranged are a voice coil motor (VCM) 24, a ramp load mechanism 25, a latch mechanism 26 and a board unit 21. The VCM 24 rotates and positions the HSA 22, the ramp load mechanism 25 holds the magnetic heads 17 in unload positions where they are separated from the magnetic disks 16, when the magnetic heads 17 are moved to outermost circumferential part of the magnetic disks 16, the latch mechanism 26 holds the HSA in a retreat position when an impact or the like acts on the HDD, and the board unit 21 comprises a conversion connector, etc.

A printed circuit board (not shown) is attached to an outer surface of the bottom wall 12a of the base 12. The printed circuit board controls operations of the spindle motor 18, the VCM 24 and the magnetic heads 17 through the board unit 21. A circulation filter 23 configured to capture dust caused in the housing 10 by the operations of the movable parts is provided on the side wall 12b of the base 12, and is positioned outside the magnetic disks 16. Further, a breather filter 15 configured to capture dust from the air flowing into the housing 10 is provided on the side wall 12b.

As shown in FIG. 1, the HSA 22 comprises a rotatable bearing unit 28, four arms 32 attached to the bearing unit 28 in a stacked state, suspension assemblies 30 respectively extending out from the arms 32, and spacer rings (not shown) provided between the arms 32 arranged in the stacked state. Each of the arms 32 is formed of, for example, stainless steel, aluminum or the like into an elongate and thin plate-shape. Each arm 32 comprises a distal end portion at its extended end side. At the distal end portion, a caulking seating face having a caulking hole (not shown) is formed.

FIG. 2 schematically shows the magnetic head in a flying state and the magnetic disks. As shown in FIGS. 1 and 2, each of the magnetic disks 16 comprises a substrate 101 formed of a nonmagnetic substance and in the shape of a disc having a diameter of approximately 2.5 inches (6.35 cm). On both surfaces of the substrate 101, soft magnetic layers 102, magnetic recording layers 103 and protection film layers 104 are stacked in this order. The soft magnetic layers 102 are provided as underlying layers and formed of material exhibiting a soft magnetic characteristic.

As shown in FIG. 2, each of the magnetic heads 17 is formed as a flying type head, and comprises a slider 31 formed in a substantially rectangular parallelepiped shape, and a head section 33 formed in an outflow end (trailing) side of the slider. Each magnetic head 17 is supported on a distal end portion of a suspension 34 by a gimbal portion 36 of a flexure, which will be described later. Each magnetic head 17 is flied by airflow B which is generated between a surface of the magnetic disk 16 and the slider 31 by rotation of the magnetic disk 16. The direction of airflow B is coincident with a rotating direction of the magnetic disk 16. The slider 31 is arranged such that its longitudinal direction is substantially coincident with the direction of airflow B with respect to the surface of the magnetic disk 16.

Next, structures of the suspension assemblies 30 will be explained in detail. FIG. 3 is a plan view of each of the suspension assemblies 30, and FIG. 4 is a perspective view of each suspension assembly.

As shown in FIGS. 1, 3 and 4, each suspension assembly 30 comprises the suspension 34 extending from the arm 32, and the magnetic head 17 supported on the extended end of the suspension 34. Note that the combination of the magnetic head 17 and the suspension assemblies 30 will be called head suspension assembly.

The suspension 34, which functions as a supporting plate, includes rectangular base plate 42 formed of a metal plate having a thickness of several hundreds of microns, and a load beam 35 formed of a metal plate with a thickness of tens of microns in a shape of an elongate and thin leaf spring. The load beam 35 comprises a proximal end portion stacked on a distal end portion of the base plate 42, and is fixed to the base plate 42 by welding a plurality of portions of the load beam 35. The proximal end portion of the load beam 35 has a width substantially equal to that of the base plate 42. An elongate and thin rod-shaped tab 46 is provided at the distal end of the load beam 35 in a protruding manner.

The base plate 42 includes, at a proximal-end portion thereof, a circular opening 42a, and annular protrusion 43 positioned around the opening 42a. By fitting the protrusion 43 of the base plate 42 in the circular caulking hole (not shown) formed in the seating face for caulking provided on the arm 32, and caulking the protrusion 43, the base plate 42 is fastened to the distal-end portion of the arm 32. The distal end of the base plate 42 may be fixed to the distal end of the arm 32 by spot welding or adhesion.

The suspension assembly 30 comprises a pair of piezoelectric elements (PTZ elements) 50 and a flexure (trace member) 40 formed in the shape of an elongate belt-shape and configured to transmit a recording signal and a reproduction signal for the magnetic head 17 and an actuation signal for the piezoelectric elements 50. As shown in FIGS. 3 and 4, the flexure 40 comprises a distal end portion 40a attached to upper surfaces of the load beam 35 and the base plate 42, and a posterior-half portion (extension portion) 40b extending outwards from a side edge of the base plate 42 and along a side edge of the arm 32. Also, the flexure 40 comprises a connecting end portion 40c which is located at a distal end of the extension portion 40b and comprises a plurality of connection pads 40f, which are connected to a main FPC 21b, later described.

The distal end portion of the flexure 40, which is located on the distal end portion of the load beam 35, forms the gimbal portion 36 functioning as an elastic supporting member. The magnetic head 17 is mounted on the gimbal portion 36. The magnetic head 17 is fixed onto the gimbal portion 36, and is supported on the load beam 35 through the gimbal portion 36. The pair of piezoelectric elements 50 functioning as actuation elements are attached to the gimbal portion 36, and located on the proximal end side of the load beam 35 with respect to the magnetic head 17.

Figure 6:
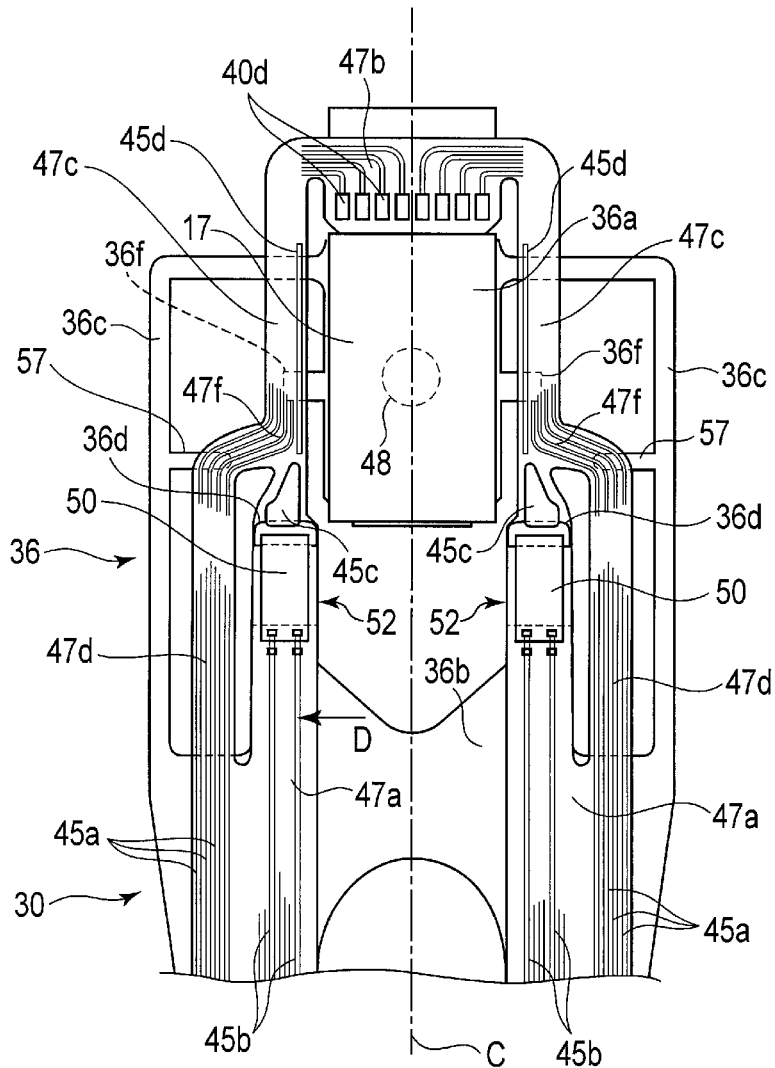
FIG. 6 is a plan view of a distal end portion of the suspension assembly.

FIG. 5 is an exploded perspective view of the magnetic head, the piezoelectric elements, the flexure and the load beam of each suspension assembly 30; FIG. 6 is a plan view of the distal end portion of each suspension assembly 30; and FIG. 7 is a plan view enlargedly showing part of the gimbal portion.

As shown in FIGS. 3 to 6, the flexure 40 comprises a thin metallic plate (lining layer) 44a formed as a base and also formed of stainless or the like, a base insulating layer 44b formed on the thin metallic plate 44a, a conductive layer (trace pattern) 44c forming a plurality of signal traces 45a and actuation traces 45b formed on the insulating layer 44b, and a cover insulating layer (protection layer) 44d stacked on the base insulating layer 44b to cover the conductive layer 44 (see FIGS. 7 and 8). The flexure 40 constitutes an elongate-band shaped lamination plate. The distal end portion 40a of the flexure 40 is attached to the surfaces of the load beam 35 and base plate 42 at the thin metallic plate 44a side thereof by adhering or spot welding at a plurality of welding points 70.

At the gimbal portion 36 of the flexure 40, the thin metallic plate 44a comprises: a rectangular tongue portion 36a located at a distal end side of the gimbal portion 36; a rectangular proximal end (plate) portion 36b located on a proximal end side of the gimbal portion 36, with a space 36e interposed between the proximal end portion 36b and the tongue portion 36a; a pair of elongate outrigger portions (link portions) 36c extending from the tongue portion 36a to the proximal end portion 36b; a pair of island-shaped division plate portions 36d located between the tongue portion 36a and the proximal end portion 36b and also located in the space 36e; and a pair of handles (support projections) 36f projecting from both side edges of the tongue portion 36a.

The proximal end portion 36b is fixed onto a surface of the load beam 35 by spot welding or the like. The proximal end portion 36b is continuously formed from the welding points 70, but it may include a cut-out or slit in the middle thereof. The tongue portion 36a is formed to have a size and shape, for example, a rectangular, that accommodates the magnetic head 17. The tongue portion 36a is arranged such that its widthwise central axis is coincident with a central axis C of the suspension 34. A substantially central portion of the tongue portion 36a is in contact with a dimple (convex portion) 48 projectingly provided at the distal end portion of the load beam 35. Further, the tongue portion 36a can be displaced in various directions as the pair of outriggers 36c elastically deform. Thereby, when the magnetic disk 16 moves, the tongue portion 36a and the magnetic head 17 mounted on the tongue portion 36a can flexibly follow rolling and pitching of the magnetic disk 16 and thus maintain a minute gap between the surface of the magnetic disk 16 and the magnetic head. The pair of handles 36f are formed of thin metallic plate 44a integrally with the tongue portion 36a, and project from the both side edges of the tongue portion 36a in a direction substantially perpendicular to the center axis C. It should be noted that a member forming the handles (support projections) 36f is not limited to the thin metallic plate 44a; that is, the handles 36f may be formed of the conductive layer 44c stacked on the thin metallic plate 44a, the base insulating layer 44b or the cover insulating layer 44d.

At the gimbal portion 36, part of the base insulating layer 44b of the flexure 40 is formed to branch into two parts located on opposite sides with respect to the central axis C of the suspension 34. The base insulating layer 44b comprises: proximal end portions 47a fixed onto the proximal end portion 36b of the thin metallic plate 44a; a distal end portion 47b bonded onto the tongue portion 36a; a pair of band-shaped first bridge portions 47c extending from the proximal end portions 47a to the distal end portion 47b; and a pair of band-shaped second bridge portions 47d located abreast with the first bridge portions 47c and extending from the proximal end portions 47a to middle portions of the first bridge portions 47c to join the first bridge portions 47c. The first bridge portions 47c are located abreast with the outriggers 36c on the both sides of the tongue portion 36a, and extend in substantially parallel with the central axis C of the suspension 34, i.e., along the longitudinal direction of the load beam 35. Also, the first bridge portions 47c extend over the handles 36f and crossbars of the outriggers 36c, and are partially fixed to the handles 36f and the crossbars. It should be noted that the outriggers 36c may be provided between the tongue portion 36a and the first bridge portions 47c. If they are provided in such a manner, the first bridge portions 47c are partially fixed to the handles 36f.

As shown in FIGS. 6 and 7, the second bridge portions 47d are located between the first bridge portions 47c and the outriggers 36c, and extend abreast with the first bridge portions 47c and the outriggers 36c. The second bridge portions 47d join the first fridge portions 47c at joining portions 47f located close to the handles 36f. At the joining portions 47f, an angle θ between each of the first bridge portions 47c and a respective one of the second bridge portions 47d is set to fall within the range of 45° to less than 90°. The pair of island-shaped division plate portions 36d of the thin metallic plate 44a are located between the joining portions 47f and the proximal end portion 47a and fixed to the lower surfaces of the first bridge portions 47c.

At the gimbal portion 36, the conductive layer 44c comprises a plurality of signal traces 45a extending from the proximal end portion 47a of the base insulating layer 44b to the distal end portion 47b through the second bridge portions 47d, the joining portions 47f and the first bridge portions 47c; and actuation traces 45b extending from the proximal end portion 47a to middle portions of the first bridge portions 47c. The signal traces 45a are connected to a plurality of electrode pads 40d provided at the distal end portion 47b. The conductive layer 44c includes reinforcement trace portions 45c formed on the first bridge portions 47c in respective positions close to the joining portions 47f and the division plate portions 36d. The conductive layer 44c may include ground traces or dummy traces 45d which extend to the handle 36f over the first bridge portions 47c. It should be noted that the actuation traces 45b are provided to extend from the proximal end portions 47a to the middle portions of the first bridge portions 47c through the second bridge portions 47d and the joining portions 47f.

As shown in FIG. 7, each reinforcement trace portion 45c is located on the respective first bridge portion 47c between the respective division plate portion 36d and the respective joining portion 47f. In the embodiment, the reinforcement trace portion 45c and the first bridge portion 47c include inclined edges 51 which gradually become thinner from the division plate portion (36d) side (i.e., the actuation element side to be described later) toward the joining portion 47f such that they are inclined toward the central line C of the suspension. Since such inclined edges 51 are provided, it is possible to adjust a central position of rotation of the magnetic head 17, which accompanies expansion and contraction of the piezoelectric elements 50, which will be described later, such that the central position of rotation is located above the central line C of the suspension.

As shown FIG. 6, at the gimbal portion 36, the first bridge portions 47c, the second bridge portions 47d, the outriggers 36c and the traces 45a and 45b are located on the both sides of the tongue portion 36a, and provided bilaterally symmetrical with respect to the central axis C of the suspension 34. In the embodiment, the gimbal portion 36 includes auxiliary bridges 57 located close to the joining portions 47f to extend between the outriggers 36c and the second bridge portions 47d. The auxiliary bridges 57 are formed of projections of the thin metallic plate 44a, which extend from the outriggers 36c.

As shown in FIGS. 3 to 7, the magnetic head 17 is fixed to the tongue portion 36a by an adhesive. The magnetic head 17 is arranged such that its central axis is coincident with the central axis C of the suspension 34, and a substantially central portion of the magnetic head 17 is located on the dimple 48. Record and reproduction elements of the magnetic head 17 are electrically joined to the electrode pads 40d of the distal end portion 47b by soldering or a conductive adhesive such as a sliver paste. Thereby, the magnetic head 17 is connected by the electrode pads 40d to the signal traces 45a, which are provided to transmit a record and reproduction signal.

As the pair of piezoelectric elements 50, which serve as actuation elements, for example, thin film piezoelectric elements (PZT elements) formed in the shape of a rectangular plate are applied. The piezoelectric elements 50 are not limited to thin film type one (a thickness of about 10 μm); and a bulk type of or a bulk lamination (a thickness of 50 μm or more) type of piezoelectric elements may be applied as the piezoelectric elements 50. The piezoelectric elements 50 are not limited to PZT elements; that is, another type of piezoelectric elements may be applied as the piezoelectric elements 50. Furthermore, the actuation elements are not limited to the piezoelectric elements 50; that is, as the actuation elements, members configured to extend and contract by an applied voltage may be applied.

FIG. 8 is a cross-sectional view of a piezoelectric element mounting area, which is taken along line A-A in FIG. 7. As shown in FIGS. 6 to 8, each piezoelectric element 50 is bonded on the upper surface of the respective first bridge portions 47c by an adhesive agent or the like. That is, each first bridge portions 47c formed of the insulating film 44b comprises the lower surface opposing the metal thin film 44a, and the upper surface on an opposite side to the lower surface. A respective piezoelectric element 50 is bonded onto the upper surface of the respective first bridge portion 47c. The piezoelectric elements 50 are disposed such that the longitudinal direction (elongation/contraction direction) of the piezoelectric elements 50 is parallel to longitudinal directions of the load beam 35 and bridge portions 47c. Thus, the piezoelectric elements 50 are arranged in parallel with each other and on the left and right sides of the magnetic head 17. However, the piezoelectric elements 50 may also be disposed in such a manner as to be inclined with respect to the longitudinal direction of the bridge portions 47c. For example, the two piezoelectric elements 50 may be arranged in an inverted V shape.

The division plate portion 36d and the proximal end portion 36b of the metal thin plate 44a are located to be apart from each other by a length (distance) L, and an opening 54a is formed therebetween. The respective piezoelectric element 50 is located on the insulating layer 44b (the first bridge portion 47c) such as to stretch over the entire opening 54a. The respective piezoelectric element 50 is adhered to the respective first bridge portion 47c such that a longitudinal end (in the expansion/contraction directions) of the element 50 is located to overlap the proximal end portion 36b of the metal thin film 44a and the other longitudinal end thereof is located to overlap the division plate portion 36d. Each piezoelectric element 50 is electrically connected to the actuation traces 45b.

In the embodiment, the flexure 40 comprises a counter-plate 52 configured to suppress the out-of-plane vibration of the respective piezoelectric element 50 and the respective first bridge portion 47c. The counter-plate 52 is adhered or fixed on the lower surface of the first bridge portion 47c of the insulating layer 44b between the proximal end portion 36b and the division plate portion 36d of the metal thin film 44a so as to oppose the piezoelectric element 50 via the insulating layer 44b. The counter-plate 52 is formed of, for example, a stainless plate having a thickness substantially equal to that of the metal thin plate 44a. As shown in FIGS. 7 and 8, the counter-plate 52 is formed into, for example, a rectangle having a width substantially equal to that of the piezoelectric element 50 and a length shorter than the length L of the opening 54a. Further, the counter-plate 52 is provided to oppose at least a part of the piezoelectric element 50. In this embodiment, the counter-plate 52 is disposed to oppose a longitudinal central portion of the piezoelectric element 50, and to be separated by a gap from the proximal end portion 36b and the division plate portion 36d of the metal thin film 44a.

The material for the counter-plate 52 is not limited to stainless steel, but it may be some other metal such as copper or nickel, or a synthetic resin or the like. The shape of the counter-plate 52 is not limited to a rectangle, but may be some other shape. The counter-plate 52 may be formed to have a width greater than that of the piezoelectric element 50 or greater than that of the first bridge portion 47c. The length, width, thickness and shape of the counter-plate 52 can be selected appropriately according to the degree of suppression of vibration.

Figure 9:
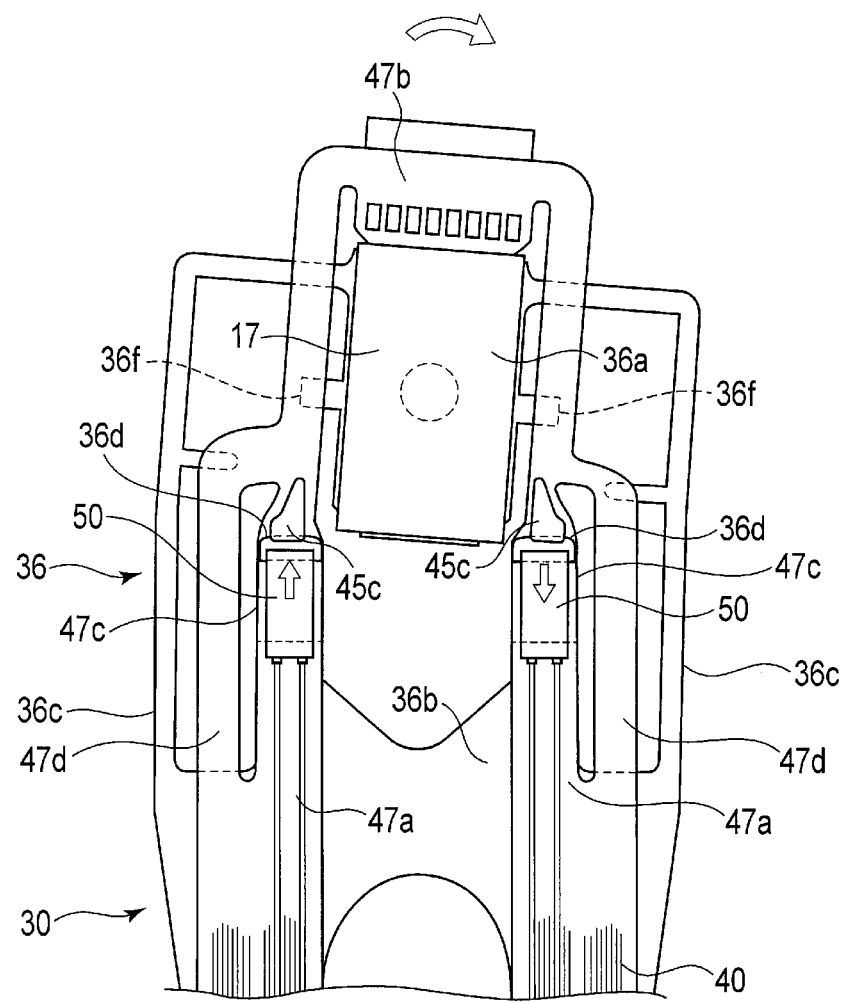
FIG. 9 is a plan view schematically showing a minute displacement state of the magnetic head due to a piezoelectric element.

The piezoelectric elements 50 are extended or contracted in their longitudinal direction (planer direction) when a voltage (drive signal) is applied thereto through the actuation traces 45b. To be more specific, as shown in FIG. 9, the two piezoelectric elements 50 are driven in opposite directions where they expand and contract, to thereby cause the first bridge portions 47c to rock the tongue portion 36a of the gimbal portion 36 and also displace the magnetic head 17 in a seek (cross-tracking) direction. The counter-plate 52 is configured to suppress the out-of-plane vibration of the respective piezoelectric element 50 and the respective first bridge portion 47c when the piezoelectric elements 50 expand or contract, that is, to suppress deformation and vibration of the piezoelectric elements 50 in their surfaces or in themselves in directions crossing the expansion/contraction directions of the elements. With this structure, it is possible to prevent unnecessary out-of-plane vibration from propagating to the load beam 35 or the magnetic head 17, thereby improving the accuracy of positioning the magnetic head 17. Further, since the out-of-plane vibration of the piezoelectric elements 50 is suppressed, it becomes possible to retain a sufficient stroke of the piezoelectric elements 50 in the expansion/contraction directions thereof. Thus, the position of the magnetic head 17 can be controlled with even higher accuracy.

In the meantime, as shown in FIG. 1, the HSA 22 comprises a support frame extending from the bearing unit 28 in a direction away from the arms 32, and the support frame includes a voice coil which is embedded therein, and which forms part of the VCM 24. Each of the magnetic disks 16 is located between associated two of the suspension assemblies 30, with the HSA 22 mounted in the base 12. While the HDD is being operated, the magnetic heads 17 of the suspension assemblies 30 face upper and lower surfaces of the magnetic disks 16, and are located on both sides of the magnetic disks 16. The voice coil, which is fixed to the support frame, is located between a pair of yokes 37 fixed onto the base 12. The voice coil, the yokes 37 and a magnet (not shown) fixed to one of the yokes 37 constitute the VCM 24.

As shown in FIG. 1, the board unit 21 includes a main flexible print circuit board (hereinafter referred to as a main FPC) 21b extending from a main body 21a thereof. An extended end of the main FPC 21b forms a connecting end portion, and is fixed in the vicinity of the bearing unit 28 of the HSA 22. The connecting end portion 40c of the flexure 40 of each suspension assembly 30 is mechanically and electrically connected to the connecting end portion of the main FPC 21b. Thereby, the board unit 21 is electrically connected to the magnetic heads 17 and the piezoelectric elements 50 by the main FPC 21b and the flexures 40.

In the HDD and the suspension assembly 30 with the above mentioned structure, a drive signal (for example, a voltage) is applied to the piezoelectric elements 50 through the flexures (trace members) 40, thereby enabling the magnetic head 17 attached to the gimbal portion 36 to be displaced in the seeking direction. By virtue of this feature, it is possible to minutely control the position of the magnetic head 17 by controlling the voltage to be applied to the piezoelectric elements 50, and thus improve the accuracy of positioning of the magnetic head.

In the mounting area of each piezoelectric element 50, the counter-plate 52 which opposes the respective piezoelectric element 50 via the insulating layer 44b is provided on the respective first bridge portion 47c. With the counter-plate 52, it is possible to suppress the out-of-plane vibration of the respective piezoelectric element 50 and the respective first bridge portion 47c, that is, to suppress deformation and vibration of the piezoelectric elements 50 in their surfaces or in themselves in directions crossing the expansion/contraction directions of the elements. Thus, the resonance of the load beam 35 or the magnetic head 17 can be effectively reduced, thereby making it possible to improve the accuracy of positioning the magnetic head 17.

First Modification

FIG. 10 is a cross-sectional view of a mounting area of a suspension assembly according to a first modification. According to this modification, a counter-plate 52 is subjected to half-etching in a mounting area of a piezoelectric element 50 so as to make the counter-plate 52 thinner than a metal thin plate 44a. The thickness of the counter-plate 52 is set to, for example, about half that of the metal thin plate 44a.

The first modification having the above-described structure exhibit an advantageous effect similar to that of the first example described before. Further, when the counter-plate 52 is made thinner, the weight thereof is reduced, thereby making it possible to reduce the vibration of the counter plate 52 itself. Further, the constraint force of the counter-plate 52, which is applied to the expansion/contraction operation of the piezoelectric elements 50, is reduced, thereby making it possible to increase the drive force and stroke of the piezoelectric elements 50.

FIG. 11 shows results of simulation of analysis on vibration for the suspension assemblies of the first embodiment, the first modification and a comparative example, obtained by using finite-element analysis. It is assumed that the suspension assembly of the comparative example did not comprise a counter-plate 52. In the simulation, the thickness of the load beam was set to 30 μm; that of the metal thin plate 44a of the flexure 40, to 18 μm; that of the insulating layer 44b, to 8 μm; that of the conductive layer 44c, to 12 μm; and that of the piezoelectric elements 50, to 10 μm. The distance L between the proximal end portion 36b and the division plate portion 36d of the metal thin plate 44a was set to 30 mm, and the length and width of the counter-plate 52 were 0.2 mm and 0.1 mm, respectively.

FIG. 11 illustrates characteristics of propagation of vibration of the slider of the magnetic head in the tracking direction when a voltage is applied to the piezoelectric elements 50 for each assembly, and mainly the characteristics thereof in the vicinity of the twisted secondary resonance of the load beam which appears in a band of 21 kHz. From this figure, it is understood that under the same voltage input conditions, the resonance of the load beam is excited in a band of 2,000 to 21,200 Hz in the suspension assembly of the comparative example, whereas the resonance of the load beam is not excited in those of the first embodiment and the first modification.

As described above, according to the first embodiment and the first modification, it is possible to provide a suspension assembly which can suppress unnecessary out-of-plane vibration and improve the accuracy of positioning the head, such a head suspension assembly and a disk device comprising the same.

Next, suspension assemblies of another embodiment and modification will now be described. In the following embodiment, structural parts identical to those of the first embodiment described above will be designated by the same reference numbers, and detailed descriptions therefor will be omitted.

Second Embodiment

Figure 12:
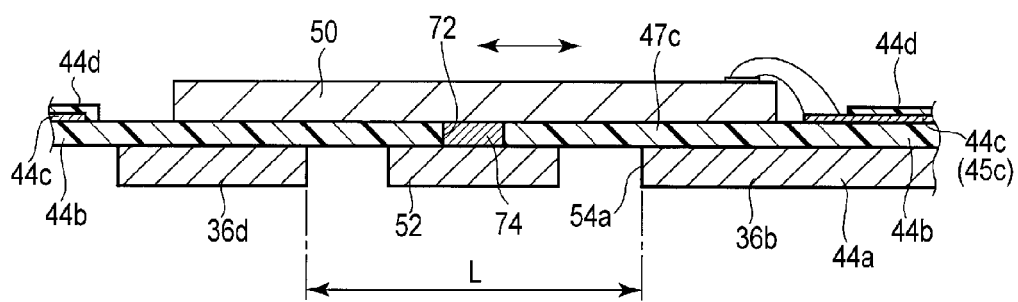
FIG. 12 is an enlarged cross-sectional view of an actuation element mounting area of a suspension assembly according to a second embodiment.

FIG. 12 is a cross-sectional view of a mounting area of a suspension assembly according to a second embodiment. According to this embodiment, a first bridge portion 47c of an insulating layer 44b on which a piezoelectric element 50 is mounted comprises a transparent hole 72 or a gap at a position facing a longitudinal central portion of the piezoelectric element 50. For example, the first bridge portion 47c comprises a rectangular transparent hole 72 at a position facing a longitudinal central portion of the piezoelectric element 50. A counter-plate 52 is formed of, for example, a material similar to that of a metal thin plate 44a, that is, a stainless steel plate. The counter-plate 52 is adhered or fixed on the lower surface of the first bridge portion 47c of the insulating layer 44b between a proximal end portion 36ba and a division plate portion 36d of the metal thin film 44a so as to oppose the piezoelectric element 50 via an insulating layer 44b. Further, the counter-plate 52 is configured to cover the rectangular transparent hole 72 or gap of the first bridge portion 47c as a top.

The piezoelectric element 50 is adhered to an upper surface of the first bridge portion 47c with adhesive. When adhering, the adhesive, still wet, spreads over the transparent hole 72 to be able to stably adhere and fix the piezoelectric element 50. At the same time, the adhesive is confined within the transparent hole 72 so that creeping of the adhesive to the front side of the piezoelectric element 50 can be prevented.

With the counter-plate 52, the second embodiment can exhibit an advantageous effect similar to that of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the above-described embodiments are described to have such a structure that the pair of piezoelectric elements 50 are mounted on the gimbal portion 36 so as to be located on the proximal end side of the load beam 35 with respect to the magnetic head 17, but they are not limited to this structure. The pair of piezoelectric elements 50 may be disposed, for example, on both ends of the support member (tongue portion) which supports the magnetic head to be aligned with the head. The piezoelectric elements 50 are not limited to a pair, but, for example, a single piezoelectric element may be provided on a distal end of a slider.

In the above-described embodiments, the arm of the HAS is a separated plate arm, but is not limited to this structure. For example, a plurality of arms having the so-called E-block shape and a bearing sleeve may be integrated as a unit to be used in these embodiments. Further, the size of the magnetic disks is not limited to 2.5 inches, but may be some other size. The number of magnetic disks is not limited to 2, but may be 1, 3 or more, in which case, the number of suspension assemblies may be decreased or increased according to the number of magnetic disks.

What is claimed is:

1. A suspension assembly comprising:
   a support plate;
   a trace member attached to the support plate; and
   an actuation element configured to expand and contract, and fixed to the trace member,
   wherein
   the trace member comprises a metallic plate comprising a proximal-end plate portion fixed to the support plate and a division plate portion located apart from the proximal-end plate portion, an insulating layer on the metallic plate and comprising a bridge portion extending from the proximal end plate through the division plate portion, a conductive layer on the insulating layer to form a plurality of traces, and a counter-plate provided on the bridge portion between the proximal-end plate portion and the division plate portion and opposing the actuation element via the insulating layer, and
   the actuation element is located on the bridge portion to extend across over to the proximal-end plate portion and the division plate portion.

2. The suspension assembly of claim 1, wherein the counter-plate is a metal or a synthetic resin.

3. The suspension assembly of claim 1, wherein the counter-plate has a thickness less than that of the metallic plate.

4. The suspension assembly of claim 1, wherein the counter-plate comprises a material identical to that of the metallic plate and has a thickness equal to that of the metallic plate.

5. The suspension assembly of claim 1, wherein the counter-plate has a length less than a distance between the proximal-end plate portion and the division plate portion, and is disposed apart from the proximal-end plate portion and the division plate portion.

6. The suspension assembly of claim 1, wherein the bridge portion of the insulating layer comprises a gap or a transparent hole at a position opposing the actuation element, and the counter-plate is fixed to the bridge portion to cover the gap or transparent hole of the bridge portion.

7. The suspension assembly of claim 6, wherein the actuation element is adhered to the bridge portion with adhesive, and a portion of the adhesive fills the gap or transparent hole.

8. The suspension assembly of claim 1, wherein the actuation element comprises one end portion and an other end portion in expansion/contraction directions, and the one end portion is supported on the proximal-end plate portion via the insulating layer and the other end portion is supported on the division plate portion via the insulating layer.

9. A head suspension assembly comprising:
   the suspension assembly of claim 1; and
   a magnetic head supported on the suspension assembly.

10. The head suspension assembly of claim 9, wherein the counter-plate is a metal or a synthetic resin.

11. The head suspension assembly of claim 9, wherein the counter-plate has a thickness less than that of the metallic plate.

12. The head suspension assembly of claim 9, wherein the counter-plate comprises a material identical to that of the metallic plate and has a thickness equal to that of the metallic plate.

13. The head suspension assembly of claim 9, wherein the counter-plate has a length less than a distance between the proximal-end plate portion and the division plate portion, and is disposed apart from the proximal-end plate portion and the division plate portion.

14. The head suspension assembly of claim 9, wherein the bridge portion of the insulating layer comprises a gap or a transparent hole at a position opposing the actuation element, and the counter-plate is fixed to the bridge portion to cover the gap or transparent hole of the bridge portion.

15. A disk device comprising:
    a recording medium comprising a recording layer;
    the suspension assembly of claim 1; and
    a magnetic head supported on the suspension assembly.

16. The disk device of claim 15, wherein the counter-plate is a metal or a synthetic resin.

17. The disk device of claim 15, wherein the counter-plate has a thickness less than that of the metallic plate.

18. The disk device of claim 15, wherein the counter-plate comprises a material identical to that of the metallic plate and has a thickness equal to that of the metallic plate.

19. The disk device of claim 15, wherein the counter-plate has a length less than a distance between the proximal-end plate portion and the division plate portion, and is disposed apart from the proximal-end plate portion and the division plate portion.

20. The disk device of claim 15, wherein the bridge portion of the insulating layer comprises a gap or a transparent hole at a position opposing the actuation element, and the counter-plate is fixed to the bridge portion to cover the gap or transparent hole of the bridge portion.

* * * * *